Patented July 16, 1940

2,208,175

UNITED STATES PATENT OFFICE 2,208,175

MANUFACTURE OF ALKALI SULPHATE

William S. Wilson, Brookline, Mass., assignor, by mesne assignments, to Monsanto Chemical Company, a corporation of Delaware No Drawing. Application November 18, 1936, Serial No. 111,364

18 Claims. (Cl. 23—121)

My invention relates to the manufacture of hydrogen chloride and an alkali sulphate such as sodium sulphate, or potassium sulphate of a high purity with increased efficiency and economy of operation, from sulphuric acid and the corresponding alkali chloride.

The manufacture of an alkali sulphate and hydrochloric acid by the reaction of sulphuric acid and an alkali chloride is well known and widely utilized by roasting a mixture of sulphuric acid or acid alkali sulphate and an alkali chloride in various types of furnaces.

In the utilization of the furnaces and processes heretofore known, many disadvantages have become apparent which add to the cost of operation and decrease the efficiency of the process. Among these is imperfect mixing of the materials causing a low conversion of the alkali chloride with a resulting high alkali chloride content of some portions of the alkali sulphate produced and excessive amounts of free acid in other portions. To attain complete conversion of the alkali chloride to alkali sulphate with this type of mixture requires long retention in the roasting equipment. Moreover, in utilizing the furnaces known to the art wherein the mixing is accomplished by means of rotating parts, movable arms, hammers, traveling shafts or similar mechanical devices, breakage, wear and corrosion are responsible for a high cost of upkeep and necessitate frequent plant shut-downs for repairs with corresponding increases in the cost of maintenance of the plant. It has also been found that the mixture obtained by these methods often fuses under certain conditions into hard, compact balls which are a source of serious trouble.

An object of my invention is to convert a molecular mixture of an alkali chloride and the corresponding alkali acid sulphate of high reactivity substantially completely to alkali sulphate and hydrogen chloride in a very short time, thus permitting the same production of useful materials with much smaller equipment and requiring a correspondingly decreased capital investment.

In addition my invention has as an object the attainment of an improved fuel economy through a novel means for transferring heat to the mixture prepared as indicated below and at the same time the production of a high strength hydrogen chloride gas.

An additional object of my invention is to obtain a salt cake or alkali sulphate product in the form of free flowing pellets of uniform size which do not have the property of bunching or lumping up as those produced by other processes do.

Other objects will be apparent from the following description.

If molecular quantities of sulphuric acid and alkali chloride be mixed in a suitable type of mixer the reactants first form a homogeneous solution after which the following reaction occurs:

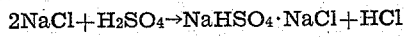

The resulting solid product is a mixed crystal of alkali acid sulphate and alkali chloride and possesses as a distinctive property a very high reaction rate upon heating as compared with the usual mechanical mixture of alkali chloride and alkali hydrogen sulphate. (The particular manner by which this mixture is made forms no part of the present invention nor is my invention limited thereby.) This high reacting rate and molecular association permit the completion of the reaction

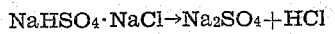

in twenty to thirty minutes at a temperature of 300 to 400° C. Moreover, the mixture is so uniform that the object of forming a salt cake or alkali sulphate containing less than .25% acid and alkali chloride may be attained. In fact, the heat of reaction whereby the mixed crystal is formed may under some conditions be enough to promote to a limited extent the alkali sulphate forming reaction.

I have found that this type of mixed crystal compound becomes fluid at temperatures of 140°–160° C. and that by mixing it with alkali sulphate which has been heated to temperatures of 500–800° C. the mixture will melt and coat over the surface of the alkali sulphate, thus distributing the reacting materials in a very thin layer over the heat carrying material. The necessary heat for completing the reaction is thus furnished by the hot salt cake or alkali sulphate and the very thin layer formed by causing a given crystal to melt and spread over the surface permits rapid gas evolution and quick conversion.

I have also discovered that by allowing this peculiar mixed crystal to melt on and increase the size of a nucleus while rotating, pellets of any desired size may be formed by recirculation.

One convenient procedure consists in supplying both the mixed crystal and the salt cake continuously to a continuously discharging drum or cement mixer which is insulated against heat loss or which may be externally heated. In the latter case, the amount of hot salt cake required is reduced or may even be dispensed with entirely. The output of the equipment is thereby increased very materially and the construction thereof is simplified.

The method of transferring heat which I have discovered permits an arrangement of apparatus which will produce a high strength hydrochloric acid gas and in addition give a high thermal efficiency, as the description of my process, given below, will show.

The following is a specific example illustrating my invention. Commercial salt is dried so as to remove all moisture and ground so that it will all pass through a 100 mesh screen. A charge of 700 pounds is carefully weighed out and transferred to any of several types of commercial mixers, preferably one permitting maximum intermixing of solid and liquid, with or without auxiliary crushing or grinding action. Preferably it is maintained at an elevated temperature to avoid corrosion which might otherwise result if moisture entered the system. To the foregoing charge 586 pounds of 100% sulphuric acid, heated to a temperature of 93–121° C., are added quickly and under conditions calculated to effect intimate and prompt mixing. The mass in the mixer will form a perfectly homogeneous mixture, evolving copious amounts of hydrogen chloride gas which may be absorbed in the usual manner. After one or two minutes of complete fluidity a mixed crystal of the composition $NaHSO_4 \cdot NaCl$ will separate and dry out instantaneously to a fine powder. This reaction taking place in the mixer is exothermic. Part of the heat generated which has not been removed in the discharged gas is sufficient to carry out a part of the endothermic reaction

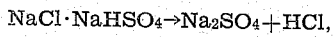

$$NaCl \cdot NaHSO_4 \rightarrow Na_2SO_4 + HCl,$$

so that the resulting mixer product may show that as much as 51–56% or even more of the total chlorine content of the initial salt charge has been evolved as hydrogen chloride. By eliminating air leakage the gas will be of very high hydrogen chloride content.

While monohydrate acid gives good results it is to be understood that oleum or somewhat dilute sulphuric acid may be used.

The mixed crystal is supplied to an insulated finishing reactor, such as a rotating kiln or a drum cement mixer from which the gas can be recovered. It may be of any suitable mechanical design to avoid excess loss of heat on the one hand and capable of affording intimate mixture of the hot roasted salt cake and the mixed crystal on the other. The hot salt cake at a temperature of 500°–800° C. causes the warm mixed crystals at 50°–80° C. to melt and "paint over" the surface of some of the particles of salt cake. This type of contact furnishes the maximum rate of heat transfer from the hotter to the cooler material, inducing such a high reaction rate to the unconverted material that the mass becomes a hard, high melting material before it can reach and coat on the ceramic shell of the reactor. It is not possible to attain this state of conditions with mechanically made salt and niter cake mixtures, since such material has a much lower reaction rate at the same temperature, and it is impossible to eliminate excessive melting of niter cake since the points of contact between reacting constituents are so very much fewer than are to be found in the case of a mixed crystal granulated from a perfectly homogeneous solution of the composition $NaCl \cdot NaHSO_4$. The relative quantities of salt cake and mixed crystal used are dependent on the temperature of the entering materials and the heat losses. The ratio is 1½–2½ parts of salt cake to 1 part of partially converted mixture if the entering salt cake temperature is 800°–650° C. and 2–5 parts of salt cake to 1 part of the mixed crystal at entering temperatures of 650–500° C. This finishing reactor is operated continuously at a uniform feed rate so that a continuous concentrated hydrogen chloride gas stream is discharged to the acid purification and absorption apparatus. If, for any existing gas absorption system, it becomes necessary to provide an absolutely uniform gas load, this may be obtained by operating two mixer units in parallel.

The $NaCl \cdot NaHSO_4$ mixed crystal will react substantially completely in five to ten minutes with an initial salt cake temperature of 650–800° C. and in twenty minutes when it is 500°–650° C. so that the material discharged is 98–99% converted to sodium sulphate. In form it consists of rounded globular pellets. The reaction rate is so high that much smaller and simpler installations are possible for the same production of salt cake than in previous processes where a longer retention time is necessary to ensure mixing of reacting constituents and complete reaction.

The mixture discharged from the reactor will be at 260–425° C.

The discharged material which is 98–99% converted is now heated in a direct fire kiln to complete the reaction to sodium sulphate and supply hot roasted product for the recycling operation at 500–700° C. The size, rate of rotation and pitch of the kiln are so adjusted as to require 30–45 minutes for the product to pass through the kiln although this time is in no wise critical. During this period and under the conditions of heat treatment the small amount of residual acid and sodium chloride reacts so that the residual product contains less than .25% sodium chloride and sulphuric acid. The amount of hydrogen chloride gas liberated in the calciner and mixed with furnace gases is so small that it need not be recovered.

The overall recoverable sodium chloride conversion of 98.5%, divided between the mixer and finishing reactor in variable ratio, is higher than that obtained by the previously known mechanical furnaces used for the production of salt cake by interaction of sulphuric acid and salt, or niter cake and salt. Further savings are made through increased thermal efficiency, increased saving on capital investment, repairs and maintenance.

What I claim is:

1. The method of producing sodium sulphate and HCl of high strength characterized in that sodium acid sulphate and sodium chloride in intimate admixture are brought to reaction temperature whereby HCl is evolved by means of solid sodium sulphate previously heated to a temperature substantially above reaction temperature.

2. The method of producing sodium sulphate and HCl of high strength characterized in that sodium acid sulphate and sodium chloride in intimate admixture are brought to reaction temperature whereby HCl is evolved by adding said admixture to a mass of said mixture and sodium sulphate which is in the solid state and above reacting temperature.

3. The process of producing sodium sulphate characterized in that a mixed crystal of sodium acid sulphate and sodium chloride is subjected to reaction temperature by contacting it with solid sodium sulphate previously heated to a temperature substantially above reaction temperature.

4. The process of producing sodium sulphate characterized in that a mixed crystal of sodium acid sulphate and sodium chloride is subjected to reaction temperature whereby HCl is evolved by adding it to a mixture of said mixed crystal and sodium sulfate which is in the solid state and above reacting temperature.

5. The method of forming a globular sodium sulphate according to which a mixed crystal of sodium acid sulphate and sodium chloride is added to solid sodium sulphate heated to the fluxing temperature of the mixed crystal and thereafter completing the conversion of the mixed crystal to form sodium sulphate.

6. The method as defined in claim 1 and further characterized in that the mass of sodium sulphate and the mixture is such that it maintains a consistency of a solid during the heating operation.

7. The method of producing sodium sulphate characterized in that an intimate admixture of sodium acid sulphate and sodium chloride is converted to hydrogen chloride and sodium sulphate by heat at least in part provided by contacting said admixture with previously heated solid sodium sulphate.

8. In the preparation of hydrogen chloride and sodium sulphate from sodium chloride and sodium acid sulphate, the step which comprises mixing the chloride and acid sulphate with sufficient solid sodium sulphate which is at a temperature above reaction temperature whereby the reaction of chloride and acid sulphate may be caused to go substantially to completion without requiring additional heat.

9. The method of preparing hydrogen chloride and sodium sulphate which comprises causing two mols of sodium chloride and one mol of sulphuric acid to react to an intermediate stage and subsequently completing the reaction by mixing the intermediate product with sufficient solid sodium sulphate which is at a temperature above reaction temperature whereby the reaction of chloride and acid sulphate may be caused to go substantially to completion without requiring additional heat.

10. The method of preparing hydrogen chloride and sodium sulphate from sodium chloride and sodium acid sulphate which comprises mixing solid sodium sulphate which is at a temperature above reaction temperature with the chloride and acid sulphate whereby heat from the sodium sulphate is imparted to said chloride and acid sulphate mixture.

11. In the preparation of hydrogen chloride and sodium sulphate by the reaction of sodium chloride and sodium acid sulphate, the step which comprises mixing the chloride and acid sulphate with sufficient solid sodium sulphate from an external source which is at a temperature sufficiently above reaction temperature to cause the reaction of chloride and acid sulphate to go substantially to completion without requiring additional heat.

12. The method of preparing hydrogen chloride and sodium sulphate which comprises causing two mols of sodium chloride and one mol of sulphuric acid to react to an intermediate stage and subsequently completing the reaction by mixing the intermediate product with sufficient solid sodium sulphate from an external source which is at a temperature sufficiently above reaction temperature to cause the reaction of chloride and acid sulphate to go substantially to completion without requiring additional heat.

13. The method of preparing hydrogen chloride and sodium sulphate from sodium chloride and sodium acid sulphate which comprises mixing solid sodium sulphate from an external source which is at a temperature above reaction temperature with the chloride and acid sulphate whereby heat from the sodium sulphate is imparted to said chloride and acid sulphate mixture.

14. The process of producing sodium sulphate characterized in that a mixed crystal of sodium acid sulphate and sodium chloride is subjected to reaction temperature by mixing it with solid sodium sulphate previously heated to a temperature of at least 500° C.

15. The method of producing sodium sulphate and HCl of high strength characterized in that sodium acid sulphate and sodium chloride in intimate admixture are brought to reaction temperature whereby HCl is evolved by mixing said admixture with solid sodium sulphate previously heated to a temperature of at least 500° C.

16. The method of producing sodium sulphate characterized in that an intimate admixture of sodium acid sulphate and sodium chloride is converted to hydrogen chloride and sodium sulphate by heat, at least in part provided by mixing said admixture with previously heated solid sodium sulphate at a temperature of substantially not less than 500° C. nor more than 800° C.

17. The method of producing sodium sulphate and HCl of high strength characterized in that a mixture of sodium acid sulphate and sodium chloride is subjected to reaction temperature by mixing it with solid sodium sulphate from a subsequent step in the process, which sulphate has been previously heated to a temperature of at least 500° C.

18. The method of producing sodium sulphate characterized in that an intimate admixture of sodium acid sulphate and sodium chloride is converted to hydrogen chloride and sodium sulphate by heat, at least in part provided by mixing said admixture with previously heated solid sodium sulphate from a subsequent step in the process, which sulphate is at a temperature of substantially not less than 500° C. nor more than 800° C.

WILLIAM S. WILSON.